(12) United States Patent
Moser et al.

(10) Patent No.: US 8,820,850 B2
(45) Date of Patent: Sep. 2, 2014

(54) ROLLING ELEMENT FOR THE POLYDIRECTIONAL TRAVEL OF A VEHICLE, AND VEHICLE HAVING SUCH A ROLLING ELEMENT

(75) Inventors: Roland Richard Moser, Zurich (CH); Josef Erni, Winterthur (CH)

(73) Assignee: ALSTOM Technology Ltd, Baden (CH)

( * ) Notice: Subject to any disclaimer, the term of this patent is extended or adjusted under 35 U.S.C. 154(b) by 421 days.

(21) Appl. No.: 13/353,510

(22) Filed: Jan. 19, 2012

(65) Prior Publication Data

US 2012/0144937 A1    Jun. 14, 2012

Related U.S. Application Data

(63) Continuation of application No. PCT/EP2010/062649, filed on Aug. 30, 2010.

(30) Foreign Application Priority Data

Aug. 31, 2009 (CH) ........................... 1347/09

(51) Int. Cl.
    *B60B 19/14*      (2006.01)
    *B60B 33/08*      (2006.01)

(52) U.S. Cl.
    CPC ............. *B60B 33/08* (2013.01); *B60B 19/14* (2013.01)
    USPC ............................. 301/5.1; 73/865.8

(58) Field of Classification Search
    CPC ...... B60B 19/003; B60B 19/006; B60B 19/14
    USPC .................................. 301/5.1; 73/865.8
    See application file for complete search history.

(56) References Cited

U.S. PATENT DOCUMENTS

| | | | | |
|---|---|---|---|---|
| 2,687,546 | A * | 8/1954 | Oppenheimer | 16/26 |
| 3,456,281 | A | 7/1969 | Lowry | |
| 3,609,612 | A * | 9/1971 | Tibbling | 335/289 |
| 5,220,869 | A * | 6/1993 | Pelrine et al. | 105/78 |
| 5,355,807 | A * | 10/1994 | Pelrine et al. | 105/78 |
| 5,388,528 | A * | 2/1995 | Pelrine et al. | 105/78 |
| 6,000,484 | A * | 12/1999 | Zoretich et al. | 180/7.1 |

FOREIGN PATENT DOCUMENTS

| | | | |
|---|---|---|---|
| DE | 1816923 | 6/1970 | |
| DE | 4234727 | 4/1994 | |
| EP | 2070572 A2 * | 6/2009 | ............. A63H 33/38 |

(Continued)

OTHER PUBLICATIONS

Search Report for Swiss Patent App. No. 1347/2009 (Jun. 22, 2010).

*Primary Examiner* — Hezron E Williams
*Assistant Examiner* — Nathaniel Kolb

(57) ABSTRACT

In a rolling element (10) for the polydirectional travel of a vehicle on a magnetically attractive underlying surface (19), a compact, robust and simple design is made possible in that the rolling element (10) has a spherical element (11) and at least one permanent magnet (14). The spherical element (11) supports the at least one permanent magnet (14) in such a way that the at least one permanent magnet (14) maintains its spatial orientation when the spherical element (11) rolls on the underlying surface (19), and the spherical element (11) is held in contact against the underlying surface (19) by the magnetic interaction of the at least one permanent magnet (14) with the underlying surface (19).

21 Claims, 3 Drawing Sheets

(56) References Cited

FOREIGN PATENT DOCUMENTS

| | | | |
|---|---|---|---|
| GB | 2493370 A * | 2/2013 | |
| JP | 7-215003 | 8/1995 | |
| JP | 2000-016004 | 1/2000 | |
| JP | 2000-025408 | 1/2000 | |
| JP | 2008-044477 | 2/2008 | |
| WO | WO2011/023820 | 3/2011 | |

* cited by examiner

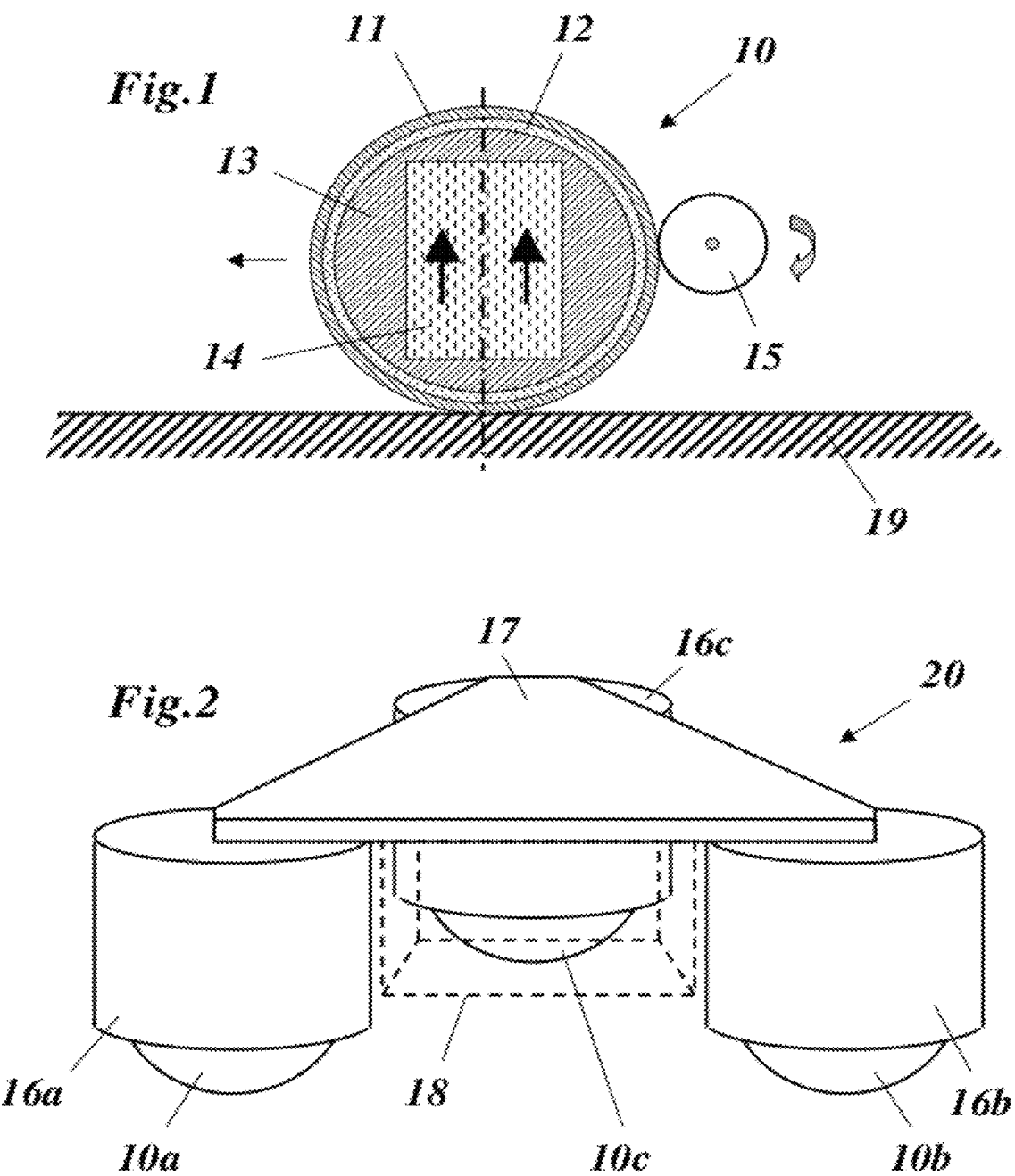

ROLLING ELEMENT FOR THE POLYDIRECTIONAL TRAVEL OF A VEHICLE, AND VEHICLE HAVING SUCH A ROLLING ELEMENT

This application is a Continuation of, and claims priority under 35 U.S.C. §120 to, International Application No. PCT/EP2010/062649, filed 30 Aug. 2010, and claims priority therethrough under 35 U.S.C. §§119, 365 to Swiss Application No. 01347/09, filed 31 Aug. 2009, the entireties of which are incorporated by reference herein.

BACKGROUND

1. Field of Endeavor

The present invention relates to the field of vehicles. It relates to a rolling element for the polydirectional travel of a vehicle, and to a vehicle having such a rolling element.

2. Brief Description of the Related Art

In the manually-executed standard methods for non-destructive testing of components in the field of power plants, such as for example turbine blades, turbine housings or the like, ultrasound or electromagnetically operating sensors, a predefined sampling pattern must be adhered to or retraced. The person performing the testing holds the corresponding sensor by hand and moves it over that region of the component which is of interest. A typical sampling pattern runs in a meandering fashion over the region to be tested.

If that process is to be automated by a robot or scanner, there are presently two solutions: in one solution, use is made of a serially operating robot, for example in the form of a robot arm, to the free end of which the sensor is attached. In the other solution, a frame is placed onto the region to be tested, in which frame the sensor can be moved independently in two mutually orthogonal directions, in the manner of an X-Y plotter.

A serially operating robot is not only very cumbersome in terms of spatial requirement and equipment, but rather must also, for sampling, be set up for the spatial design of the object surface. In the case of a scanner, the frame must be matched to the object geometry in advance, which results in a very low degree of flexibility during use.

SUMMARY

The aforementioned and additional disadvantages could be overcome by an autonomous, small robot vehicle which adheres, so as to be capable of polydirectional travel, to the surface of the object to be tested and which guides the sensor provided for the testing over the surface along a programmed sampling pattern. Here, for the capability of polydirectional travel, a spherical rolling element is required, on which the vehicle is mounted. At the same time, an attractive force should be provided which holds the vehicle on the object surface. Here, use may be made of magnetic forces, since the objects to be tested are usually composed of ferromagnetic material.

One of numerous aspects of the present invention includes a rolling element for the polydirectional travel of a vehicle on a magnetically attractive underlying surface, which rolling element meets the stated conditions, is of simple and compact construction and which, on account of its robustness, is suitable for use under harsh conditions.

Another aspect includes a rolling element which is a spherical element and comprises at least one permanent magnet, and the spherical element supports the at least one permanent magnet in such a way that the at least one permanent magnet maintains its spatial orientation when the spherical element rolls on the underlying surface, and that the spherical element is held in contact against the underlying surface by the magnetic interaction of the at least one permanent magnet.

One embodiment is characterized in that the spherical element is a ball and is mounted, so as to be polydirectionally rotatable, in the interior of the at least one permanent magnet.

Here, it is possible in particular for the at least one permanent magnet to be formed as a hollow cylinder which surrounds the ball.

Another embodiment is characterized in that the spherical element is a spherical shell, and in that the at least one permanent magnet is mounted, so as to be polydirectionally rotatable, in the interior of the spherical shell.

The spherical shell is preferably composed of a non-ferromagnetic material.

Furthermore, it is advantageous for the at least one permanent magnet to be embedded in a ball which is composed of non-ferromagnetic material and which is mounted, so as to be polydirectionally rotatable, in the spherical shell.

To obtain the required mobility, an intermediate space is provided between the spherical shell and the ball which encloses the at least one permanent magnet.

The intermediate space may be filled with a gas, in particular air.

The intermediate space may however also be filled with an anti-friction agent which reduces the friction between the ball and spherical shell.

Furthermore, the at least one permanent magnet may be of cylindrical design.

Another embodiment is characterized in that the rolling element can be driven by a drive wheel which bears against the outer surface of the spherical element.

Another aspect includes a vehicle for polydirectional travel on a magnetically attractive underlying surface which is equipped with at least one rolling element according to principles of the present invention.

In particular, the vehicle moves on a plurality of the rolling elements.

It is preferable for three rolling elements to be provided, which are arranged in a triangle.

Here, at least one of the rolling elements is assigned a drive by which the rolling element can be driven.

It is particularly advantageous for the plurality of rolling elements to be connected to one another by a common platform, and for devices for the use of the vehicle to be arranged below and/or above the platform.

The devices for the use of the vehicle preferably comprise a controller for automatically controlling the movement of the vehicle.

According to one preferred embodiment, the vehicle is designed as a testing robot, in particular for the non-destructive testing of a test specimen composed of ferromagnetic material, in particular of a blade airfoil of a compressor or of a turbine, and supports a corresponding testing device.

It is self-evidently also possible within the scope of the invention for the rolling element and the vehicle equipped therewith to be used for other purposes.

BRIEF DESCRIPTION OF THE DRAWINGS

The invention will be explained in more detail below on the basis of exemplary embodiments in conjunction with the drawing, in which:

FIG. 1 shows, in section, a first exemplary embodiment of a rolling element according to the invention, in which a permanent magnet is arranged in the interior of a spherical shell, and in which a drive is also schematically indicated;

FIG. 2 shows, in a perspective side view, an autonomous vehicle, equipped with three rolling elements in a triangle arrangement, according to another exemplary embodiment of the invention;

DETAILED DESCRIPTION OF EXEMPLARY EMBODIMENTS

Figure 3:
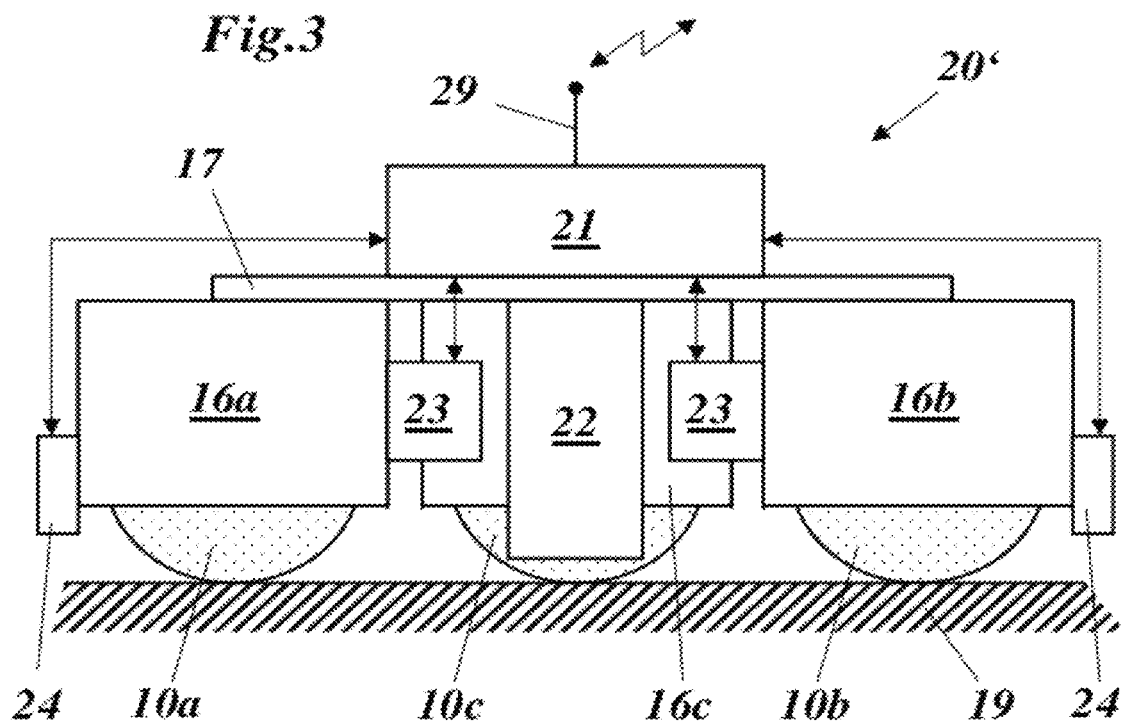
FIG. 3 shows, in a side view, the vehicle from FIG. 2 with various devices for its operation.

To be able to move a vehicle in any desired direction, and to also be able to rotate that vehicle about its own axis, it is possible to mount the vehicle on balls. Here, a vehicle is to be understood generally to mean a vehicle of virtually any size which should be capable of travelling on an underlying surface. In the following application example, the vehicle is an autonomous robot of the size of a hand, which robot, for non-destructive testing, should travel over the surface of a component which is loaded during operation, such as for example a turbine blade.

Since it is often the case that the body which forms the underlying surface is composed of a ferromagnetic material, the vehicle, as it travels, should be held on the surface through the utilization of magnetic forces. Because magnetism always occurs in the form of dipoles, uniform magnetization of a ball is physically impossible, such that balls used for mounting the vehicle cannot simultaneously exert the attractive action on the ferromagnetic underlying surface.

Therefore, within the scope of the invention, a rolling element is proposed as a vehicle "wheel" which is suitable for polydirectional movements and which generates magnetic adhesion.

FIG. 1 shows, in section, a first exemplary embodiment of such a rolling element 10 according to principles of the present invention. A (preferably cylindrical) permanent magnet 14 is arranged (for example embedded) within a ball 13 composed of non-ferromagnetic material. The ball 13 with the permanent magnet 14 situated therein is accommodated, so as to be rotatable in any desired direction, in a spherical shell 11 composed of non-ferromagnetic material. Provided between the ball 13 and the spherical shell 11 which surrounds the ball 13 is an (approximately spherical-shell-shaped) intermediate space 12 which is filled with a gas, in particular air, or else with an anti-friction agent such as for example oil or the like in order to ensure free rotatability of the spherical shell 11 with respect to the ball 13.

If the rolling element 10—as shown in FIG. 1—rolls on an underlying surface 19 composed of ferromagnetic material (for example a turbine shaft, a pipe, a turbine blade, a tank or similar component from the field of power plants), the magnetic forces exerted by the permanent magnet 14 hold the rolling element 10 firmly on the top of the underlying surface 19. The magnetic attraction remains unchanged even if the rolling element 10 travels with the spherical shell 11 rolling on the underlying surface 19, because the permanent magnet 14, on account of the free rotatability of the ball 13 within the spherical shell 11, is always aligned with the cylinder axis perpendicular to the top of the underlying surface 19, and the spacing to the underlying surface 19 remains constant.

For the movement of the rolling element 10 on the underlying surface 19, there are three degrees of freedom: two orthogonal (x, y) directions parallel to the top of the underlying surface 19, and a rotation about the cylinder axis of the permanent magnet 14.

The rolling element 10 of FIG. 1 may be used as a passive "wheel" of a vehicle in order to ensure polydirectional mobility of the vehicle and magnetic adhesion to the underlying surface 19. The rolling element 10 may, however, also be used as a drive element. In this case, one or more drive wheels 15 may be provided which roll with friction on the surface of the spherical shell 11 and move the latter in one or more directions, as is schematically shown in FIG. 1 for the case of a single drive wheel 15.

If one or more rolling elements 10 are arranged on a vehicle, corresponding bearings must be provided for these. One particularly simple example of such a vehicle in the form of an autonomous testing robot is shown in FIG. 2 in a perspective side view. In the testing robot 20 of FIG. 2, three rolling elements 10a, 10b and 10c of the type shown in FIG. 1 are arranged in a triangle in order to ensure stable support of the testing robot on the surface of the component to be tested. Each of the rolling elements 10a, 10b and 10c is mounted with low friction, and so as to be polydirectionally rotatable, in an associated bearing 16a, 16b and 16c. The bearings 16a, 16b and 16c with the associated rolling elements 10a, 10b and 10c are fastened to the corners of a triangular platform 17 which holds the devices required for the autonomous operation of the testing robot 20. On the one hand, the top side of the platform 17 is available for this purpose. On the bottom side of the platform 17, a further usable space 18 is formed between the bearings 16a, 16b, 16c, which usable space 18 can be used in particular for accommodating the testing devices which are directed toward the underlying surface 19.

A testing robot 20' equipped in an exemplary form is shown in FIG. 3 in a side view. Here, a controller 21 is arranged on the platform 17, which controller 21 can communicate wirelessly via an antenna 29 with an external control unit, and controls and monitors both the movement of the vehicle and also the execution of the testing processes. For driving the rolling elements 10a, 10b, 10c, corresponding (electric) drives 23 are provided which are connected to the controller 21. To be able to determine the position of the testing robot 20' in a slip-free manner, one or more position transducers 24 are attached to the vehicle, which position transducers 24 for example optically determine the movement relative to the underlying surface 19 and output corresponding signals to the controller 21. Also arranged below the platform 17 is a testing device 22 which operates using ultrasound or electromagnetically and by means of which the underlying surface 19 or the component to be tested can be sampled in a non-destructive fashion.

Figure 5:
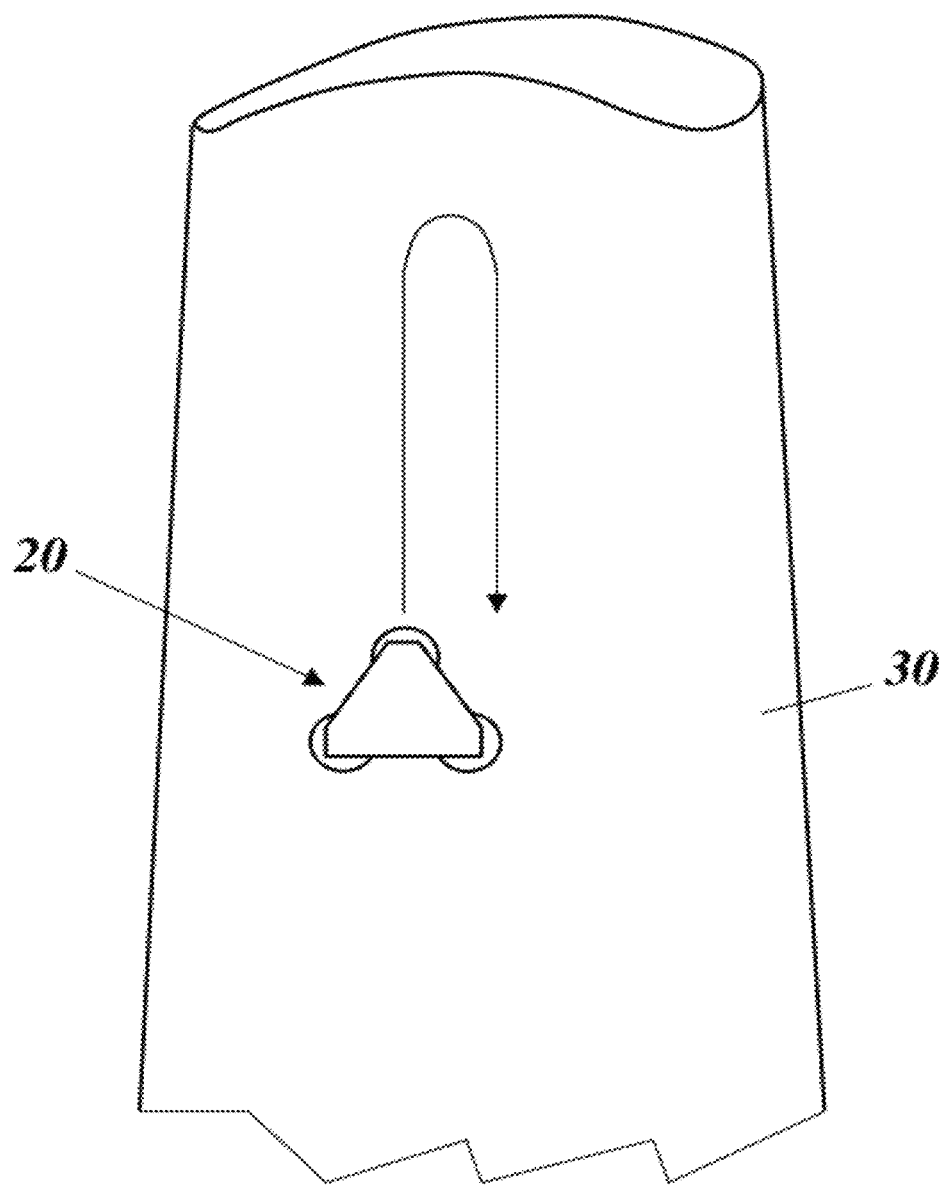
FIG. 5 shows the use of a vehicle according to FIG. 3 for the testing of a blade airfoil of a turbine or compressor blade.

Such a testing robot 20 or 20' is for example placed, according to FIG. 5, on the blade airfoil 30 of a turbine blade and travels, following a predefined movement pattern, over the surface of the blade airfoil 30 in order to inspect the blade for cracks or other irregularities. Here, use is made of rolling elements 10a, 10b and 10c of the type shown in FIG. 1 which have an outer diameter of 20 mm and with which—when suitable permanent magnets are used—adhesion forces of up to 30 N can be attained. This force is sufficient to hold the weight of the "bare" testing robot of 180 g and the devices arranged thereon with a weight of 1 kg.

Figure 4:
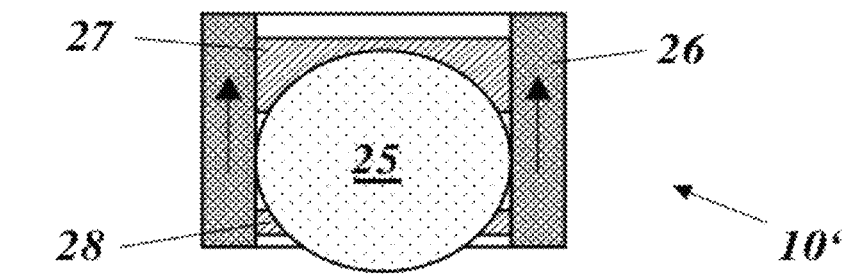
FIG. 4 shows, in section, a second exemplary embodiment of a rolling element according to the invention, in which a ball is arranged in the interior of a permanent magnet.

Within the scope of the present invention, it is conceivable, instead of the design of the rolling elements shown in FIG. 1, to select an inverse design in which the permanent magnet surrounds the spherical element at the outside. Such an alternative design is shown in FIG. 4. Here, in the rolling element 10', a ball 25 is rotatably mounted in a hollow cylindrical permanent magnet 26 by suitable bearing elements 27, 28. The ball 25 protrudes a sufficient distance in the downward direction to be able to roll freely on the underlying surface 19. Even though the position of the permanent magnet 26 is not stable in the case of the free rolling element 10', the permanent magnet 26 is fixed by the platform 17 when the rolling element 10' is installed, corresponding to FIG. 2, in a vehicle.

Overall, in addition to the individual rolling element, a testing robot which is movable in all directions and has the following characteristics and advantages:

As an omnidirectional scanner, the testing robot is a prerequisite for the automation of hitherto manually executed inspections.

The testing robots are small, lightweight and flexible and can be used universally, that is to say for many different geometries.

They are easy to transport and make "in situ" testing significantly easier.

They can be used in most situations, because very many components are composed of ferromagnetic material.

The rolling elements may also be used in vehicles which are intended for carrying out not only testing, but also work operations (cleaning, renovation etc.) at inaccessible locations.

List of Reference Numerals
10, 10' Rolling Element
11 Spherical Shell
12 Intermediate Space
13 Ball (non-ferromagnetic)
14 Permanent Magnet (for example cylindrical)
15 Drive Wheel
16a,b,c Bearing (rolling element)
17 Platform
18 Usable Space
19 Underlying Surface
20,20' Testing Robot (capable of polydirectional travel)
21 Controller
22 Testing Device
23 Drive
24 Position Transducer
25 Ball
26 Permanent Magnet (for example hollow cylindrical)
27,28 Bearing Element
29 Antenna
30 Blade Airfoil (turbine)

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A rolling element useful for the polydirectional travel of a vehicle on a magnetically attractive underlying surface, the rolling element comprising:
a spherical element and at least one permanent magnet, wherein the spherical element supports the at least one permanent magnet so that the at least one permanent magnet maintains a spatial orientation relative to the underlying surface when the spherical element rolls on the underlying surface, and wherein the spherical element is held in contact against the underlying surface by the magnetic interaction of the at least one permanent magnet with the underlying surface when the spherical element is placed on the underlying surface.

2. The rolling element as claimed in claim 1, wherein:
the at least one permanent magnet comprises an interior; and
the spherical element is a ball polydirectionally rotatably mounted in the interior of the at least one permanent magnet.

3. The rolling element as claimed in claim 2, wherein the at least one permanent magnet comprises a hollow cylinder which surrounds the ball.

4. The rolling element as claimed in claim 1, wherein:
the spherical element comprises a spherical shell having an interior; and
the at least one permanent magnet is polydirectionally rotatably mounted in the interior of the spherical shell.

5. The rolling element as claimed in claim 4, wherein the spherical shell is formed of a non-ferromagnetic material.

6. The rolling element as claimed in claim 4, further comprising:
a ball formed of non-ferromagnetic material, the ball being polydirectionally rotatably mounted in the spherical shell; and
wherein the at least one permanent magnet is embedded in the ball.

7. The rolling element as claimed in claim 6, further comprising an intermediate space between the spherical shell and the ball.

8. The rolling element as claimed in claim 7, wherein the intermediate space is filled with a gas.

9. The rolling element as claimed in claim 7, wherein the intermediate space is filled with air.

10. The rolling element as claimed in claim 7, further comprising:
an anti-friction agent filling the intermediate space which reduces the friction between the ball and spherical shell.

11. The rolling element as claimed in claim 6, wherein the at least one permanent magnet is cylindrical.

12. The rolling element as claimed in claim 1, further comprising:
a drive wheel which bears against the outer surface of the spherical element, the drive wheel being configured and arranged to drive the rolling element.

13. A vehicle for polydirectional travel on a magnetically attractive underlying surface, the vehicle comprising at least one rolling element as claimed in claim 1.

14. The vehicle as claimed in claim 13, comprising a plurality of said rolling elements.

15. The vehicle as claimed in claim 14, wherein the plurality of rolling elements comprises three rolling elements arranged in a triangle.

16. The vehicle as claimed in claim 14, further comprising:
a drive positioned relative to at least one of the rolling elements by which the rolling element can be driven.

17. The vehicle as claimed in claim 14, further comprising;
a common platform connecting together the plurality of rolling elements; and
a controller, a communication device, a testing device, or combinations thereof arranged below or above the platform.

18. The vehicle as claimed in claim 17, wherein the controller comprises a controller configured and arranged to automatically control the movement of the vehicle.

19. The vehicle as claimed in claim 18, wherein the testing device comprises a non-destructive testing device for a test specimen formed of ferromagnetic material.

20. A method of non-destructively testing a test specimen formed at least in part of ferromagnetic material, the method comprising:
providing a vehicle according to claim 13;
moving the vehicle along the outer surface of the test specimen; and
testing the test specimen with a testing device mounted to the vehicle.

21. A method according to claim 20, wherein the test specimen comprises a blade airfoil of a compressor or of a turbine.

* * * * *